United States Patent
Beato et al.

(10) Patent No.: US 9,122,921 B2
(45) Date of Patent: Sep. 1, 2015

(54) METHOD FOR DETECTING A DOCUMENT BOUNDARY

(71) Applicant: Kodak Alaris Inc., Rochester, NY (US)

(72) Inventors: Louis James Beato, Rochester, NY (US); John J. Alescio, Penfield, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/263,181

(22) Filed: Apr. 28, 2014

(65) Prior Publication Data

US 2014/0368891 A1 Dec. 18, 2014

Related U.S. Application Data

(60) Provisional application No. 61/833,952, filed on Jun. 12, 2013.

(51) Int. Cl.
| | |
|---|---|
| *H04N 1/04* | (2006.01) |
| *G06K 9/00* | (2006.01) |
| *H04N 1/00* | (2006.01) |
| *G06K 9/32* | (2006.01) |
| *G06T 7/00* | (2006.01) |

(52) U.S. Cl.
CPC ........ *G06K 9/00463* (2013.01); *G06K 9/00442* (2013.01); *G06K 9/3275* (2013.01); *G06T 7/0085* (2013.01); *H04N 1/00748* (2013.01); *G06T 2207/10008* (2013.01); *G06T 2207/10024* (2013.01); *G06T 2207/30176* (2013.01)

(58) Field of Classification Search
CPC .......... H04N 1/00748; G06K 9/00463; G06K 9/00442; G06K 9/3275; G06T 2207/10008; G06T 2207/10024; G06T 2207/30176

USPC ................................. 358/518, 505, 474, 498
See application file for complete search history.

(56) References Cited

U.S. PATENT DOCUMENTS

| | | | |
|---|---|---|---|
| 7,835,589 | B2 | 11/2010 | Heaney, Jr. |
| 7,953,268 | B2 | 5/2011 | Nepomniachtchi |
| 7,978,900 | B2 | 7/2011 | Nepomniachtchi |
| 8,000,514 | B2 | 8/2011 | Nepomniachtchi |
| 8,320,683 | B2 | 11/2012 | Konishi |
| 8,326,015 | B2 | 12/2012 | Nepomniachtchi |
| 8,340,437 | B2 | 12/2012 | Abramoff |

(Continued)

OTHER PUBLICATIONS

D. Kumar et al., "OTCYMIST: Otsu-Canny Minimal Spanning Tree for Born-Digital Images," Document Analysis System (DAS), 2012 10th IAPR International Workshop on, IEEE, Mar. 27, 2012, pp. 389-393.

(Continued)

*Primary Examiner* — Houshang Safaipour
(74) *Attorney, Agent, or Firm* — Hogan Lovells US LLP (57) ABSTRACT

A method for detecting a document boundary in a captured digital image depicting a hardcopy document on a background. Each color channel of the captured digital image is analyzed to determine a corresponding busyness metric representing a complexity level of the image data. The color channel having a lowest busyness level is selected and analyzed to detect a document boundary of the depicted hardcopy document. The detected document boundary can be used to perform a perspective correction process to determine a corrected digital image where the depicted document has a substantially rectangular boundary.

20 Claims, 3 Drawing Sheets

(56) References Cited

U.S. PATENT DOCUMENTS

2003/0156201 A1* 8/2003 Zhang .................... 348/222.1
2008/0267502 A1 10/2008 Youngers et al.

OTHER PUBLICATIONS

A. K. Jain et al., "Automatic Text Location in Images and Video Frames," Pattern Recognition, Elsevier, GB, vol. 31, No. 12, Dec. 1, 1998, pp. 2055-2076.
International Search Report dated Feb. 5, 2015 in corresponding PCT application No. PCT/US2014/041675.
Chao Zeng et al., "Graph-Based Text Segmentation Using a Selected Channel Image," Digital Image Computing: Techniques and Applications (DICTA), 2010 International Conference on, IEEE, Piscataway, NJ, Dec. 1, 2010, pp. 535-539.
Jin-Liang et al., "Scene Text Extraction Based on HSL," Computer Science and Computational Technology, 2008, ISCSCT 2008, International Symposium on, IEEE, Piscataway, NJ, Dec. 20, 2008, pp. 315-319.
Office Communication from International Searching Authority dated Oct. 23, 2014 in corresponding PCT application No. PCT/US2014/041675.

* cited by examiner

METHOD FOR DETECTING A DOCUMENT BOUNDARY

CROSS REFERENCE TO PRIOR APPLICATION

This application is a non-provisional of 61/833,952 filed Jun. 12, 2013, entitled "Method for Detecting a Document Boundary," by Beato et al., the disclosure is incorporated herein by reference.

FIELD OF THE INVENTION

This invention pertains to the field of digital imaging, and more particularly to a method for locating a document within a captured digital image.

BACKGROUND OF THE INVENTION

Digital cameras offer significant advantages over scanners for capturing document images and other images. For example, digital cameras are generally more portable than scanners. In addition, because scanners require that the document to be digitized must be placed on a scanner platen, digital cameras are capable of capturing images of a wider variety of document types (e.g., larger documents or documents mounted in a frame) than scanners. However, the use of digital cameras creates difficulties that do not exist when using a scanner. For example, lighting conditions vary when using a digital camera, whereas the lighting conditions are generally controlled for scanners. In addition, use of a digital camera can introduce geometric distortions, which can depend on various factors such as the angle and distance of the digital camera relative to the document, the lens used by the digital camera, and whether the document is situated on a flat or curved surface. Because scanners generally utilize a moving scanner head, at a fixed distance from a document which is held flat on the platen, these distortions do not generally occur in scanners. Another difficulty in capturing images of documents with a digital camera is the wide variety of different possible background shapes, patterns and colors.

U.S. Pat. No. 8,326,015 to Nepomniachtchi, entitled "Methods for mobile image capture and processing of documents," discloses a method for document image capture and processing using mobile devices. An image of a financial document is captured using a mobile communication device and processed for data extraction. The processing includes automatically detecting the document within the image, geometrically correcting the image, binarizing the image, correcting the orientation of the image, and correcting the size of the image. The process of locating the document within the captured image uses color reduction (convert to gray scale), and morphological operations to suppress noise. "Voting" points are identified that represent the edges of the document and approximate a straight line from those points. The document corners are determined by finding the intersection points of the straight lines.

U.S. Pat. No. 8,000,514 to Nepomniachtchi et al., entitled "Methods for mobile image capture and processing of checks," and related discloses a method for document image capture and processing using mobile devices. An image of a check is captured using a mobile communication device and processed for data extraction. This patent teaches document location in the same manner as the aforementioned U.S. Pat. No. 8,326,015. The captured check images are binarized and processed using perspective correction based on the determined document location.

U.S. Pat. No. 7,978,900 to Nepomniachtchi et al., entitled "Systems for mobile image capture and processing of checks," discloses a method for automated document processing using mobile devices. Captured images are optimized and enhanced for data extraction. The processing operations include automatically detecting the document within the image, geometrically correcting the image, binarizing the image, correcting the orientation of the image, and correcting the size of the image. An analogous process is described in U.S. Pat. No. 7,953,268 to Nepomniachtchi, entitled "Methods for mobile image capture and processing of documents."

U.S. Pat. No. 8,340,437 to Abràmoff et al., entitled "Methods and systems for determining optimal features for classifying patterns or objects in images," discloses a method for determining features for classifying patterns or objects. The described method includes separating color channels and using Independent Component Analysis for object detection for medical imaging.

U.S. Patent Application Publication No. 2003/0156201 to Zhang, entitled "Systems and methods for processing a digitally captured image," discloses a method for processing a digitally captured image of a document. The method includes transforming the digitally captured image into a grayscale image and applying an adaptive threshold to determine a binary image. The binary image is searched using iterative pixel progression to detect a plurality of edges. The detected plurality of edges are analyzed to determine at corners associated with the imaged document so that the identified corners can be used for perspective correction.

U.S. Pat. No. 7,835,589 to Heaney, Jr. et al., entitled "Photographic document imaging system," describes a method for processing a captured image including a document. The method includes distinguishing an imaged document from its background, adjusting the captured image to reduce distortions and properly orienting the document. Edges of an imaged document are identified using an edge detection algorithm, and intersection points of the lines are determined to be potential corners.

U.S. Pat. No. 8,320,683 to Konishi, entitled "Image processing method, image processing apparatus, image reading apparatus, and image forming apparatus," describes a method for comparing an obtained document image against a set of references images and determining which reference images is most like the obtained reference image.

There remains a need for improved methods for processing captured images of documents to identify a document boundary that can be used to perform perspective correction.

SUMMARY OF THE INVENTION

The present invention represents a method for detecting a document boundary in a captured digital image of a document, the method implemented at least in part by a data processing system and comprising:

receiving a color digital image captured using a digital imaging system that depicts a hardcopy document on a background, wherein the color digital image includes image data for a plurality of color channels;

for each of the color channels analyzing the image data to determine a corresponding busyness metric, the busyness metric representing a complexity level of the image data;

selecting the color channel having a lowest busyness level;

analyzing the image data for the selected color channel to detect the document boundary of the depicted hardcopy document; and storing an indication of the detected document boundary in a processor-accessible memory.

This invention has the advantage that the color channel where the document boundary can be most robustly detected is determined based on a determined busyness level.

It has the additional advantage that the detected document boundary can be used to correct the perspective distortion of the captured color digital image to provide a perspective corrected document image. This mitigates one of the primary disadvantages of using a digital camera as a convenient portable document scanner.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
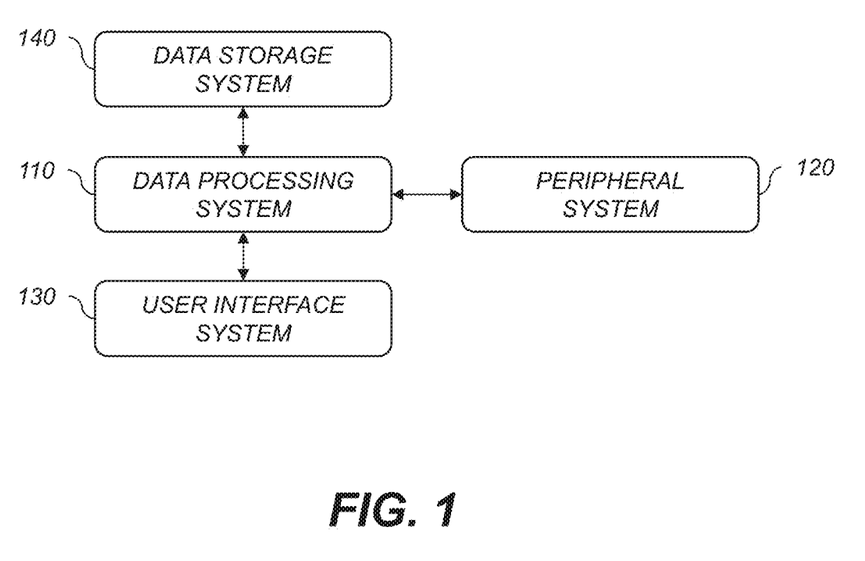
FIG. 1 is a high-level diagram showing the components of a system for processing a captured digital image according to an embodiment of the present invention.

FIG. 1 is a high-level diagram showing the components of a system for processing images according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention will now be described with reference to FIG. 2, which illustrates a flowchart for processing captured document images according to an embodiment of the present invention. The input to the method is a captured digital image 200. The captured digital image 200 is captured using a digital imaging system such as a digital camera, a camera phone or a hardcopy scanner, and depicts a scene that includes a document. The captured digital image 200 includes an array of image pixels having pixel values. Generally, the captured digital image 200 will be color image having a plurality of color channels (e.g., red (R), green (G) and blue (B) color channels).

Within the context of the present invention, the term "document" refers to any image depicted on an appropriate hardcopy of softcopy medium. Examples of documents would include reports, letters, receipts, invoices, magazines, books, newspapers, photographic prints, artwork (e.g., paintings), and content displayed on a television or computer display. The documents can include various types of content including text, graphics and photographic images. Most documents will generally have a rectangular boundary, although the boundary may be geometrically distorted according to the perspective of the digital imaging system and the flatness of the document when the image was captured.

In a preferred embodiment, a number of preprocessing operations 202 are applied to the captured digital image 200 to provide a processed digital image 225 in preparation for further processing. In the illustrated embodiment of FIG. 3, the preprocessing operations include a resize digital image step 205, a color space conversion step 210, a threshold image step 215 and a morphological processing step 220. In other embodiments, the particular preprocessing operations that are applied can be different.

The resize digital image step 205 is used to reduce the size of the captured digital image 200 to a reduced size in order to reduce the memory requirements and increase the computational efficiency of the remaining steps. The reduced size should be large enough to enable an accurate detection of the document boundary. In some embodiments, the resize digital image step 205 reduces the size of the captured digital image so that the largest dimension of the image is about 1000 pixels (e.g., 1024 pixels). In other embodiments, the image is simply resized by a fixed resize factor (e.g., 25%). Methods for resizing images are well-known in the art, and any such method can be used in accordance with the present invention. Image resizing methods typically involve applying interpolation processes such as bilinear, bicubic or nearest-neighbor interpolation. The captured digital image 200 can optionally be convolved with an appropriate anti-aliasing filter before the interpolation process is applied to reduce the formation of aliasing artifacts (e.g., "jaggies") during the resizing process.

The color space conversion step 210 performs a color space conversion to convert the image data to an appropriate color space. Methods for applying color space conversions are well-known to those skilled in the art. In a preferred embodiment, the image data is converted to the HSV color space, which is a cylindrical color space having a hue (H) color channel, a saturation (S) color channel, and a value (V) color channel. The "saturation" color channel is related to the chroma (or colorfulness) of the image, and the "value" color channel is related to the luminance (or lightness) of the image. The HSV color space is well-known and is used for applications such as computer graphics, computer vision, color pickers and image editing software packages. The HSV color space has the desirable characteristic that the color channels relate to fundamentally different perceptual attributes, and will often be relatively uncorrelated with each other. This can improve the likelihood that the document will be clearly distinguished from the background in one of the color channels.

Another similar color space that is appropriate for use with the present invention is the HSL (hue-saturation-lightness) color space. (Note that while "saturation" in HSL and HSV refers to the same perceptual attribute, their exact definitions differ dramatically.) Other variations include HSB (hue-saturation-brightness) and HSI (hue-saturation-Intensity). Each of these color spaces are specified by simple transformations of the device-dependent RGB color space. As a result, the physical colors they define depend on the colors of the red, green, and blue primaries of the device associated with the particular RGB space, and on the nonlinearity (i.e., "gamma") used to represent the amounts of those primaries. Each RGB device therefore has a unique HSV color space (and similarly a unique HSL, HSB or HSI color space) associated with it.

In other embodiments, the image data can be converted to other appropriate color spaces known in the art. For example, appropriate color spaces would include other color spaces having color channels representing lightness, chroma and hue attributes (e.g., CIE $L^*C^*h_{ab}$), or color spaces having color channels representing lightness and two color difference attributes (e.g., $YC_rC_b$, CIE $L^*a^*b^*$ or CIE $L^*u^*v^*$). Alternately, the color space conversion step 210 can be omitted so that the remaining operations are applied in the original color space of the captured digital image (e.g., sRGB).

Figure 2:
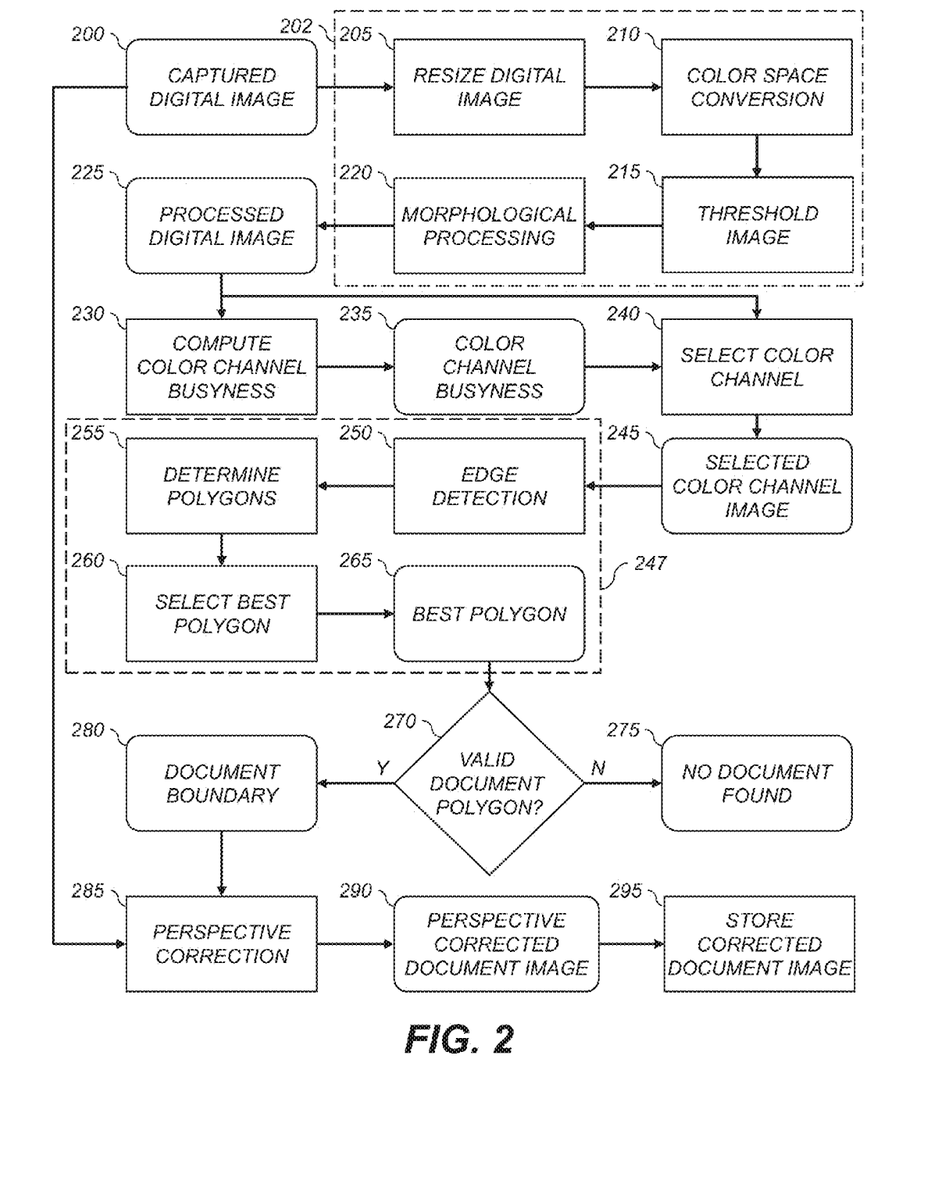
FIG. 2 is a flowchart showing a method of processing captured digital images according to an exemplary embodiment.
Figure 3:
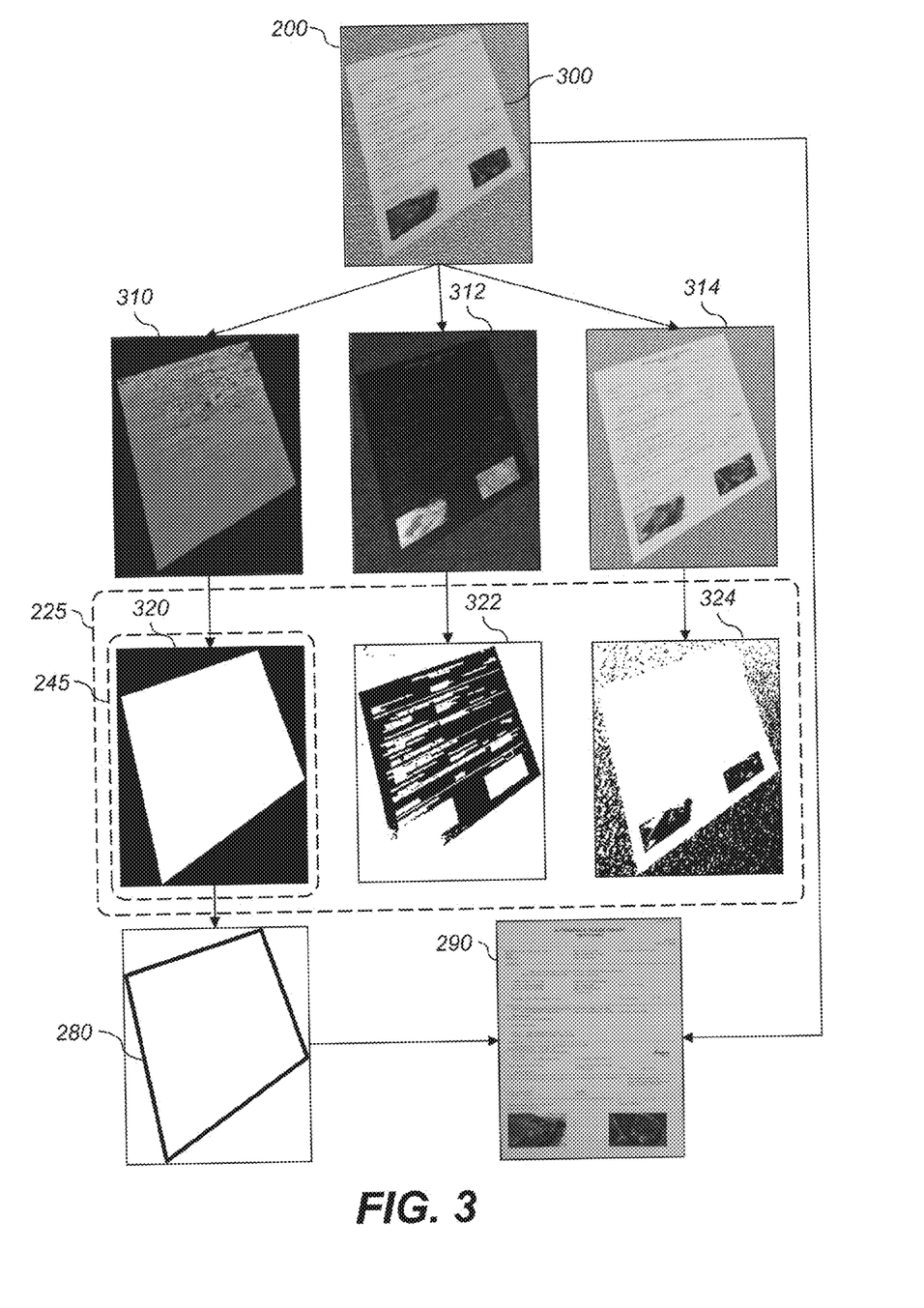
FIG. 3 shows a series of images depicting the processing of a captured digital image according to the method of FIG. 2.

FIG. 3 shows an example of a captured digital image 200 (in an RGB color space) that depicts a document 300. Following the application of the color space conversion step 210 (FIG. 2) to convert the image data to the HSV color space, the result is three color channel images: a hue color channel image 310, a saturation color channel image 312, and a value color channel image 314.

Returning to a discussion of FIG. 2, the threshold image data step 215 is used to apply a threshold to each color channel of image data to determine thresholded image data (i.e., binary image data, typically represented using pixel values of "0" and "255"). In some embodiments, predetermined thresholds can be applied to each color channel. Preferably, the threshold image step 215 analyzes statistical properties of the image data to determine an adaptive threshold appropriate for each color channel of the image data. In an exemplary embodiment, the adaptive threshold for each color channel is determined by computing the mean pixel value (i.e., the average pixel value) for that color channel. In this way, the threshold values will be specific and different for each color channel depending on the image data in the color channel. In other embodiments, the adaptive thresholds can be determined using other statistical properties (e.g., the median or the mode), or using more complex image analysis processes as is well-known in the art.

The morphological processing step 220 is used to apply a one or more morphological operations to the thresholded image data. In a preferred embodiment, the morphological operations include a dilation operation followed by an erosion operation. The dilation and erosion operations are two of the most common morphological operations known to those skilled in the art. Dilation and erosion operations are most typically applied to binary images, but some versions are also adapted to work with grayscale images. The combination of the dilation and erosion operations is often referred to as a closing operation. The effect of the closing operation is to close any small holes within foreground regions.

Dilation operations are used to enlarge the boundaries of "foreground" regions (typically, white pixels) Thus, areas of foreground pixels grow in size, while holes within those regions become smaller. Similarly, erosion operations are used to enlarge the boundaries of "background" regions (typically, black pixels) Thus, areas of foreground pixels shrink in size, while holes within background regions become smaller. Dilation/erosion operations typically utilize dilation/erosion matrices (i.e., sometimes referred to as structuring elements) defining a pixel neighborhood to be searched around a central pixel. If any pixel in the pixel neighborhood has a foreground/background value, the central pixel is replaced by the foreground/background value. In a preferred embodiment, the dilation operation uses a simple 3×3 dilation matrix, and the erosion operation uses a simple 3×3 erosion matrix.

Once the preprocessing operations 202 are completed, the processed digital image 225 is analyzed to select one of the color channels for subsequent processing. In a preferred embodiment, a compute color channel busyness step 230 is used to determine a color channel busyness 235 for each of the color channels of the processed digital image 225. The busyness is a measure of the complexity level (or randomness) of the image data. Any method for determining an image busyness metric known in the art can be used in accordance with the present invention.

In a preferred embodiment, the color channel busyness 235 is determined by counting the number of transitions (i.e., transitions from 0-to-255 or from 255-to-0) along a set of paths through the image data for a particular color channel of the processed digital image 225. Images having a larger number of transitions will generally have a higher level of complexity. In exemplary embodiment, the set of paths are the rows and columns of the processed digital image 225. In this case, the color channel busyness metric ($B_c$) for the color channel (c) can be calculated by summing the number of transitions in the horizontal direction (i.e., row-by-row) and the number of transitions in the vertical direction (i.e., column-by-column):

$$B_c = \sum_{rows} N_r + \sum_{cols} N_c \qquad (1)$$

where Nr is the number of transitions in row r, and Nc is the number of transitions in column c.

In alternate embodiments, different busyness metrics can be used to compute the color channel busyness. For example, it is well-known that less complex images (e.g., images having fewer transitions) will compress more highly using lossy image compression algorithms than more complex images (e.g., images having more transitions). Thus, the compressibility of individual color channels in the processed digital image 225 can be used as a measure of busyness. For example, the image for each color channel can be compressed using the well-known JPEG image compression algorithm, and the compressibility (for example, as characterized by the size of the compressed image) can be used as the color channel busyness 235.

Another example of a busyness metric that can be used for the color channel busyness 235 in accordance with the present invention would be to use connected component analysis to determine the number of distinct connected components (i.e., the number of distinct groups of foreground pixels). Images having a higher busyness level will generally have a larger number of distinct connected components.

Another metric that is appropriate for use as a busyness metric that can be used for the color channel busyness 235 is the image entropy. Entropy is a well-known measure of "disorder" or "uncertainty" that is commonly applied to digital images for a wide variety of applications. Images having a higher busyness level will generally have a higher entropy.

In other embodiments, the color channel busyness 235 can be determined based on determining a frequency content metric. Complex images will generally have a higher level of high-frequency content. Therefore, an example of an appropriate frequency content metric would be to determine an amount of frequency content at frequency higher than a predefined threshold frequency. It will be obvious to one skilled in the art that many other types of frequency content metrics can be used in accordance with the present invention.

A select color channel step 240 is used to select one of the color channels from the processed digital image 225 for further processing based on the computed color channel busyness 235 for each color channel. In a preferred embodiment, the color channel having the lowest color channel busyness 235 is selected. The image data for the selected color channel from the captured digital image 200 is designated as selected color channel image 245.

FIG. 3 shows an example of processed digital image 225 determined according to the described exemplary embodiment. The processed digital image 225 includes a processed hue color channel image 320, a processed saturation color channel image 322, and a processed value color channel image 324. According to the computed color channel busyness 235 (FIG. 2) for each color channel, the hue color channel image 320 is designated to be the selected color channel image 245.

Returning to a discussion of FIG. 2, the image data for the selected color channel image 245 is now analyzed using a detect document boundary process 247 to detect a document boundary 280 of the depicted hardcopy document. The detect document boundary process 247 can use any process for detecting a boundary of a document known in the art. In the depicted embodiment, an edge detection step 250 is first applied to the selected color channel image 245 to detect edges in the image data. Methods for detecting edges are well-known to those skilled in the image processing art. In a preferred embodiment, the edge detection step 250 applies the well-known Canny edge detection algorithm. The image data is first smoothed to reduce image noise. The Canny edge detection algorithm then computes the image gradient to identify regions with high spatial derivatives. A non-maximum suppression operation is then applied to suppress any pixels that are local maxima in the gradient direction. Edges in the image are then traced through a hysteresis thresholding process. Any pixels where the magnitude gradient is below a first low threshold are designated to be non-edge pixels and any pixels where the magnitude of the gradient is above a second high threshold are designated as edge pixels. If the magnitude of the gradient is between the two thresholds, then the pixel is designated as an edge if there is a path from the pixel to a pixel where the magnitude of the gradient is above second threshold. In this way, faint sections of edges can be identified.

Next, a determine polygons step 255 is applied to the edge detection processed image to identify any polygons formed by the detected edges. If an edge contour is closed and is convex, the contour can be approximated by a polygon. Any method for determining polygons from an edge contour known in the art can be used in accordance with the present invention. Three well-known methods that are commonly used to approximate polygons from edge contours are the split algorithm, the merge algorithm, and the split and merge algorithm. One form of the split-and-merge algorithm is the well-known Ramer-Douglas-Peucker algorithm. This algorithm is implemented in the OpenCV computer vision library, and was utilized in an exemplary embodiment of the present invention. The result of the determine polygons step 255 is a set of polygons, each defined by a series of vertices.

In many cases the determine polygons step 255 will determine a plurality of polygons. A select best polygon step 260 is used to select a best polygon 265 based on a set of predefined selection criteria, The best polygon 265 being the polygon that is most likely to correspond to the boundary of the depicted document. In a preferred embodiment, the selection criteria used by the select best polygon step 265 apply a sequential filtering process is used to select the best polygon 265 from the set of identified polygons.

Documents of interest will generally be quadrilaterals having four corners and four sides, therefore, as an initial filtering step, any polygons that do not have four corners can be rejected. Of the remaining four-sided polygons, those having corners that are not within a predefined tolerance of 90° (e.g., ±25°) can be rejected because it can be expected that the depicted document will generally be rectangular. Small polygons (e.g., polygons having an area less than a minimum size of 10% of the total image area) can also be filtered out, as well as duplicate polygons (polygons that are coincidental) and any polygons that share one side with any of the four image borders (border polygons). Polygons that are fully contained within a larger polygon can also be rejected. Finally, the largest remaining polygon is selected to be the best polygon 265. It will be understood by one skilled in the art, that many variations of this exemplary filtering process can be used in accordance with the present invention, as well as other types of selection methods.

A valid polygon test 270 is used to confirm that a valid polygon was found. In some cases, it may be that no polygon is identified that passes at least a baseline set of filtering steps. (Either because the captured digital image 200 didn't contain a depicted document, or because the method was unable to successfully identify the document boundary.) In this case, a no document found flag 275 can be set to indicate that no valid depicted document was found in the captured digital image 200. If a valid document polygon is found, then the best polygon 265 is designated to be the document boundary 280.

An indication of determined document boundary 280 (e.g., the coordinates of the corners of the polygon) can be stored in a processor-accessible memory (e.g., in RAM, or on a hard disk), and can be used for a variety of different applications. In some cases, the determined document boundary 280 can be used to extract the depicted document from the captured digital image 200. In some embodiments, a perspective correction process 285 can be used to correct the perspective distortions associated with the image capture process to determine a perspective corrected document image 290. Any perspective correction process 285 known in the art can be used to correct the perspective distortions in accordance with the present invention. The perspective corrected document image 290 is an improved view of the document where the distortions associated with the image capture geometry have been removed.

In a preferred embodiment, the perspective correction process 285 determines a perspective transformation matrix which is applied to transform the geometry of the captured digital image 200. The perspective transformation matrix can be computed using well-known methods given the coordinates of the four vertices of the document boundary 280 and the corresponding coordinates of the four vertices in the corrected image space. (For embodiments where a resize digital image step 205 was applied, the four vertices of the document boundary 280 should be scaled appropriately to correspond to the coordinates of the captured digital image 200.) Typically, the four vertex coordinates in the corrected image space will be four vertices with ninety degree angles. In some embodiments, a width and height of the corrected image can be estimated from the size of the edges of the document boundary 280. For example, the average of the top and bottom edges of the document boundary 280 can be used for the width of the corrected image, and the average of the left and right edges of the document boundary 280 can be used for the height of the corrected image In other embodiments, the size of the corrected image can be assumed to correspond to a predefined default document type (e.g., 8.5"×11"), and can be specified to have an appropriate resolution (e.g., 300 dpi).

The perspective transformation matrix (M) will typically have the form:

$$\begin{bmatrix} tx' \\ ty' \\ t \end{bmatrix} = M \cdot \begin{bmatrix} x \\ y \\ 1 \end{bmatrix} \quad (2)$$

where (x, y) are the source coordinates in the captured digital image 200, (x', y') are the destination coordinates in the perspective corrected document image 290, and t is a homogeneous component. The open source computer vision library OpenCV provides a simple function "getPerspectiveTransform" to create the perspective transformation matrix given the coordinates of the four vertices of the document boundary 280 and the corresponding coordinates of the four vertices in the corrected image space. The corresponding OpenCV function "warpPerspective" takes the resulting perspective transformation matrix and performs a perspective transformation to a source image (captured digital image 200) to determine a corresponding corrected image (perspective corrected document image 290). A store corrected document image step 295 can then be used to store the determined perspective corrected document image 290 in a processor-accessible memory.

Referring again to FIG. 3, a document boundary 280 is illustrated corresponding to the best polygon 265 (FIG. 2) in the selected color channel image 245. The document boundary 280 was used to determine a perspective transformation matrix which was used to transform the original captured digital image 200 to determine the perspective corrected document image 290. It can be seen that the distorted perspective in the document in the original captured digital image 200 due to the capture geometry of the digital camera has been corrected so that the perspective corrected document image 290 looks similar to what would have been captured using a conventional hardcopy scanner. In this way, the method of the present invention can be seen to provide a solution to one of the main problems associated with using a digital camera or a camera phone to serve as a convenient portable document scanner.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 captured digital image
202 preprocessing operations
205 resize digital image step
210 color space conversion step
215 threshold image step
220 morphological processing step
225 processed digital image
230 compute color channel busyness step
235 color channel busyness
240 select color channel step
245 selected color channel image
247 detect document boundary process
250 edge detection step
255 determine polygons step
260 select best polygon step
265 best polygon
270 valid document polygon test
275 no document found flag
280 document boundary
285 perspective correction process
290 perspective corrected document image
295 store corrected document image
300 document
310 hue color channel image
312 saturation color channel image
314 value color channel image
320 processed hue color channel image
322 processed saturation color channel image
324 processed value color channel image

The invention claimed is:

1. A method for detecting a document boundary in a captured digital image of a document, the method implemented at least in part by a data processing system and comprising:
receiving a color digital image captured using a digital imaging system that depicts a hardcopy document on a background, wherein the color digital image includes image data for a plurality of color channels;
for each of the color channels analyzing the image data to determine a corresponding busyness metric, the busyness metric representing a complexity level of the image data, wherein the determination of the busyness metric includes determining a compressibility metric for the image data;
selecting the color channel having a lowest busyness level;
analyzing the image data for the selected color channel to detect the document boundary of the depicted hardcopy document; and
storing an indication of the detected document boundary in a processor-accessible memory.

2. The method of claim 1 further including thresholding the image data for each of the color channels prior to computing the busyness metric.

3. The method of claim 2 wherein the thresholding of the image data includes:
analyzing the image data to determine an adaptive threshold; and
using the adaptive threshold to threshold the image data.

4. The method of claim 3 wherein the adaptive threshold is determined based on statistical properties of the image data.

5. The method of claim 2 wherein the determination of the busyness metric includes counting a number of transitions along a set of paths through the thresholded image data.

6. The method of claim 2 wherein the determination of the busyness metric includes performing a connected component analysis of the thresholded image data.

7. A method for detecting a document boundary in a captured digital image of a document, the method implemented at least in part by a data processing system and comprising:
receiving a color digital image captured using a digital imaging system that depicts a hardcopy document on a background, wherein the color digital image includes image data for a plurality of color channels;
for each of the color channels analyzing the image data to determine a corresponding busyness metric, the busyness metric representing a complexity level of the image data;
selecting the color channel having a lowest busyness level;
analyzing the image data for the selected color channel to detect the document boundary of the depicted hardcopy document; and
storing an indication of the detected document boundary in a processor-accessible memory; and
applying a perspective correction process to the captured color digital image based on the detected document boundary to determine a corrected digital image where the depicted document has a substantially rectangular boundary.

8. The method of claim 1 wherein the determination of the busyness metric includes determining an image entropy metric for the image data.

9. The method of claim 1 wherein the determination of the busyness metric includes determining a frequency content metric for the image data.

10. The method of claim 1 wherein detection of the document boundary includes performing an edge detection process to detect edges in the image data.

11. The method of claim 10 further including determining one or more polygons corresponding to the detected edges.

12. The method of claim 11 wherein a plurality of polygons are determined corresponding to the detected edges and a single polygon is selected based on one or more predefined selection criteria.

13. The method of claim 11 wherein a selection criterion discards polygons that are not quadrilaterals.

14. The method of claim 11 wherein a selection criterion discards polygons that do not have a minimum size.

15. The method of claim 1 wherein the color channels include a color channel that represents a hue attribute, a color channel that represents a saturation attribute and a color channel that represents a luminance attribute.

16. The method of claim 1 wherein the color channels include a color channel that represents a luminance attribute and two color channels representing color difference attributes.

17. The method of claim 1 wherein the color channels include red, green and blue color channels.

18. A document imaging system for capturing a digital image of a document, comprising:
- an image capture system adapted to capture a color digital image of a hardcopy document on a background, wherein the captured color digital image includes image data for a plurality of color channels;
- a data processing system; and
- a memory system communicatively connected to the data processing system and storing instructions configured to cause the data processing system to implement a method for correcting perspective distortion in the captured color digital image, wherein the method includes:
  - transforming the captured color digital image to an analysis color space having a plurality of analysis color channels;
  - for each of the analysis color channels analyzing the image data to determine a corresponding busyness metric, the busyness metric representing a complexity level of the image data;
  - selecting the analysis color channel having a lowest busyness level;
  - analyzing the image data for the selected analysis color channel to detect the document boundary of the depicted document;
  - applying a perspective correction process to the captured color digital image based on the detected document boundary to determine a corrected digital image where the depicted document has a substantially rectangular boundary; and
  - storing the corrected digital image in a processor-accessible memory.

19. A method for detecting a document boundary in a captured digital image of a document, the method implemented at least in part by a data processing system and comprising:
- receiving a color digital image captured using a digital imaging system that depicts a hardcopy document on a background, wherein the color digital image includes image data for a plurality of color channels;
- for each of the color channels analyzing the image data to determine a corresponding busyness metric, the busyness metric representing a complexity level of the image data, wherein the determination of the busyness metric includes determining an image entropy metric for the image data;
- selecting the color channel having a lowest busyness level;
- analyzing the image data for the selected color channel to detect the document boundary of the depicted hardcopy document; and
- storing an indication of the detected document boundary in a processor-accessible memory.

20. The method of claim 7 wherein the determination of the busyness metric includes determining a compressibility metric for the image data.

* * * * *